United States Patent
Liu et al.

(10) Patent No.: US 7,781,372 B2
(45) Date of Patent: Aug. 24, 2010

(54) FIBER-BASED CERAMIC SUBSTRATE AND METHOD OF FABRICATING THE SAME

(75) Inventors: James Jenq Liu, Mason, OH (US); Bilal Zuberi, Cambridge, MA (US)

(73) Assignee: GE02 Technologies, Inc., Woburn, MA (US)

( * ) Notice: Subject to any disclaimer, the term of this patent is extended or adjusted under 35 U.S.C. 154(b) by 175 days.

(21) Appl. No.: 11/831,398

(22) Filed: Jul. 31, 2007

(65) Prior Publication Data
US 2009/0035511 A1 Feb. 5, 2009

(51) Int. Cl.
B01J 21/12 (2006.01)
(52) U.S. Cl. ...................... 502/439; 502/429
(58) Field of Classification Search ............. 502/439, 502/429
See application file for complete search history.

(56) References Cited

U.S. PATENT DOCUMENTS

| | | |
|---|---|---|
| 1,993,821 A | 3/1935 | Benner et al. |
| 3,819,334 A | 6/1974 | Yoshida et al. |
| 3,899,555 A | 8/1975 | Takeo et al. |
| 3,912,658 A | 10/1975 | Kaneko et al. |
| 3,961,907 A | 6/1976 | Close et al. |
| 4,047,965 A | 9/1977 | Karst et al. |
| 4,053,011 A | 10/1977 | Riewald et al. |
| 4,071,594 A | 1/1978 | Pearson et al. |
| 4,329,162 A | 5/1982 | Pitcher, Jr. |
| 4,384,046 A | 5/1983 | Nakagami |
| 4,409,284 A | 10/1983 | Sugino et al. |
| 4,416,676 A | 11/1983 | Montierth |
| 4,417,908 A | 11/1983 | Pitcher, Jr. |
| 4,419,108 A | 12/1983 | Frost et al. |
| 4,420,316 A | 12/1983 | Frost et al. |
| 4,448,833 A | 5/1984 | Yamaguchi et al. |
| 4,608,361 A | 8/1986 | Kanamori et al. |
| 4,652,286 A | 3/1987 | Kusuda et al. |
| 4,659,610 A | 4/1987 | George et al. |
| 4,761,323 A | 8/1988 | Muhlratzer et al. |
| 4,810,458 A | 3/1989 | Oshima et al. |
| 4,824,711 A | 4/1989 | Cagliostro et al. |
| 4,828,785 A | 5/1989 | Newkirk et al. |
| 4,833,115 A | 5/1989 | Koschlig et al. |
| 4,868,142 A | 9/1989 | Waisala et al. |
| 4,968,467 A | 11/1990 | Zievers |
| 5,053,092 A | 10/1991 | Lachman |
| 5,070,588 A | 12/1991 | Miwa et al. |
| 5,075,160 A | 12/1991 | Stinton et al. |
| 5,078,818 A | 1/1992 | Han et al. |
| 5,098,455 A | 3/1992 | Doty et al. |
| 5,123,243 A | 6/1992 | Baddour |
| 5,126,431 A | 6/1992 | Nesheiwat |
| 5,153,057 A | 10/1992 | Corbett et al. |
| 5,194,407 A | 3/1993 | Waisala et al. |
| 5,194,414 A | 3/1993 | Kuma |
| 5,196,120 A | 3/1993 | White |
| 5,207,807 A | 5/1993 | Manfre et al. |
| 5,217,789 A | 6/1993 | Elliott et al. |
| 5,249,948 A | 10/1993 | Koslow |
| 5,251,564 A | 10/1993 | Rim et al. |
| 5,298,046 A | 3/1994 | Peisert |
| 5,316,710 A | 5/1994 | Tasaki et al. |
| 5,322,537 A | 6/1994 | Nakamura et al. |
| 5,335,712 A | 8/1994 | Corbett et al. |
| 5,338,253 A | 8/1994 | Damsohn et al. |
| 5,348,987 A | 9/1994 | Kato et al. |
| 5,376,341 A | 12/1994 | Gulati |
| 5,488,017 A | 1/1996 | Szweda et al. |
| 5,492,580 A | 2/1996 | Frank |
| 5,518,678 A | 5/1996 | Miyamoto et al. |
| 5,518,833 A | 5/1996 | Repplinger et al. |
| 5,545,297 A | 8/1996 | Andersen et al. |
| 5,549,859 A | 8/1996 | Andersen et al. |
| 5,611,831 A | 3/1997 | Matsuoka et al. |
| 5,622,041 A | 4/1997 | Feeley et al. |
| 5,623,013 A | 4/1997 | Tanaka et al. |
| 5,629,067 A | 5/1997 | Kotani et al. |
| 5,662,731 A | 9/1997 | Andersen et al. |
| 5,681,373 A | 10/1997 | Taylor et al. |

(Continued)

FOREIGN PATENT DOCUMENTS

| | | |
|---|---|---|
| CN | 1349839 | 5/2002 |
| EP | 0552715 | 7/1993 |
| EP | 0635298 | 1/1995 |
| EP | 0728521 | 8/1996 |
| EP | 00776696 | 6/1997 |

(Continued)

OTHER PUBLICATIONS

"Fiber-reinforced SiC", *Jpn. Technol. Highlights*, vol. 6, No. 4, Issn: 1060-8117,(Feb. 22, 1995), 15.
"Porosity reduces CMC properties", *Adv. Compos. Bull.*, ISSN: 0951-953X,(Feb. 1995),2-3.
"Rapid preforming developed for metal matrix composites", *High-Performance Composites*, vol. 9, No. 1, ISSN: 1081-9223,(Jan.-Feb. 2001),60.
Gulati, Suresh T., "Physical Durability of Thin Wall Ceramic Substrates", *SAE Technical Paper Series 982635*, (Oct. 1998).

(Continued)

*Primary Examiner*—Timothy C Vanoy
*Assistant Examiner*—Michelle Hou (57) ABSTRACT

Low cost aluminosilicate fibers are used to form a ceramic substrate material using inorganic binders that promote the formation of stable compounds that inhibit the formation of crystal silica, or cristobalite, when the substrate is used or exposed to high operating temperatures. The aluminosilicate fibers are mixed with additives including organic and inorganic binders and a fluid to form a plastic mixture. The plastic mixture is formed into a green substrate, and subsequently cured into the ceramic substrate. The fiber-based constituents permit the formation of rigid porous structures for filtration, insulation, and high temperature processes and chemical reactions.

2 Claims, 3 Drawing Sheets

U.S. PATENT DOCUMENTS

| | | | |
|---|---|---|---|
| 5,707,584 A | 1/1998 | Terpstra et al. | |
| 5,714,226 A | 2/1998 | Disselbeck | |
| 5,820,833 A | 10/1998 | Kawamura | |
| 5,851,326 A | 12/1998 | Custer et al. | |
| 5,900,207 A | 5/1999 | Danforth et al. | |
| 5,914,187 A | 6/1999 | Naruse et al. | |
| 5,928,775 A | 7/1999 | DiChiara et al. | |
| 5,948,257 A | 9/1999 | Custer et al. | |
| 5,981,415 A | 11/1999 | Waku et al. | |
| 6,040,266 A | 3/2000 | Fay, III et al. | |
| 6,057,030 A | 5/2000 | Mano | |
| 6,117,518 A | 9/2000 | Cawse et al. | |
| 6,155,432 A | 12/2000 | Wilson et al. | |
| 6,194,066 B1 | 2/2001 | Hoffman | |
| 6,228,293 B1 | 5/2001 | Kriegsmann et al. | |
| 6,238,618 B1* | 5/2001 | Brundage et al. | 264/638 |
| 6,261,510 B1 | 7/2001 | Terpstra et al. | |
| 6,321,915 B1 | 11/2001 | Wilson et al. | |
| 6,365,092 B1 | 4/2002 | Backa et al. | |
| 6,379,446 B1 | 4/2002 | Andersen et al. | |
| 6,423,537 B1 | 7/2002 | Soria et al. | |
| 6,444,006 B1 | 9/2002 | Haberkamp et al. | |
| 6,506,336 B1 | 1/2003 | Beall et al. | |
| 6,547,967 B1 | 4/2003 | Adler et al. | |
| 6,582,490 B2 | 6/2003 | Miller et al. | |
| 6,613,384 B1 | 9/2003 | Waller | |
| 6,651,773 B1 | 11/2003 | Marocco | |
| 6,669,751 B1 | 12/2003 | Ohno et al. | |
| 6,716,376 B1 | 4/2004 | Haug et al. | |
| 6,860,917 B2 | 3/2005 | Henrichsen et al. | |
| 6,881,361 B1 | 4/2005 | Schulze et al. | |
| 6,899,777 B2 | 5/2005 | Vaidyanathan et al. | |
| 6,935,461 B2 | 8/2005 | Marocco | |
| 6,946,013 B2 | 9/2005 | Alward et al. | |
| 6,991,672 B2 | 1/2006 | Marrecau et al. | |
| 6,991,673 B2 | 1/2006 | Wastijn et al. | |
| 7,041,359 B2 | 5/2006 | Hijikata | |
| 7,052,532 B1 | 5/2006 | Liu et al. | |
| 7,052,760 B2 | 5/2006 | Hijikata | |
| 7,074,480 B2 | 7/2006 | Fukutani et al. | |
| 7,078,086 B2 | 7/2006 | Hijikata | |
| 7,083,842 B2 | 8/2006 | Masukawa et al. | |
| 7,090,715 B2 | 8/2006 | Chung et al. | |
| 7,112,050 B2 | 9/2006 | Bernas et al. | |
| 7,138,002 B2 | 11/2006 | Hamanaka et al. | |
| 7,138,003 B2 | 11/2006 | Ichikawa et al. | |
| 7,141,204 B2* | 11/2006 | Horn et al. | 264/657 |
| 7,179,516 B2 | 2/2007 | Ichikawa | |
| 7,250,212 B2 | 7/2007 | Naito et al. | |
| 7,276,276 B2 | 10/2007 | Noguchi et al. | |
| 7,396,586 B2 | 7/2008 | Ohno et al. | |
| 7,413,700 B2* | 8/2008 | Merrill et al. | 264/650 |
| 7,427,309 B2 | 9/2008 | Ohno et al. | |
| 7,455,710 B2 | 11/2008 | Masukawa et al. | |
| 7,517,502 B2 | 4/2009 | Ohno et al. | |
| 7,521,389 B2* | 4/2009 | Shmotev et al. | 501/122 |
| 2001/0037972 A1 | 11/2001 | Quick et al. | |
| 2002/0014723 A1 | 2/2002 | Wallin et al. | |
| 2002/0157358 A1 | 10/2002 | Noda et al. | |
| 2003/0127393 A1 | 7/2003 | Tepper et al. | |
| 2003/0178357 A1 | 9/2003 | Wolff et al. | |
| 2004/0139734 A1 | 7/2004 | Schmeichel et al. | |
| 2004/0156766 A1 | 8/2004 | Jaussaud et al. | |
| 2004/0194505 A1 | 10/2004 | Wang et al. | |
| 2004/0197279 A1 | 10/2004 | Bleckmann et al. | |
| 2004/0231307 A1 | 11/2004 | Wood et al. | |
| 2004/0234458 A1 | 11/2004 | Riedel et al. | |
| 2005/0040003 A1 | 2/2005 | Kienzle et al. | |
| 2005/0042151 A1 | 2/2005 | Alward et al. | |
| 2005/0049362 A1 | 3/2005 | Buckley et al. | |
| 2005/0069469 A1 | 3/2005 | Fu et al. | |
| 2005/0074374 A1 | 4/2005 | Ogura | |
| 2005/0079975 A1 | 4/2005 | Fujita | |
| 2005/0102987 A1 | 5/2005 | Kudo | |
| 2005/0109023 A1 | 5/2005 | Kudo et al. | |
| 2005/0126140 A1 | 6/2005 | Ito et al. | |
| 2005/0181193 A1 | 8/2005 | Lenke et al. | |
| 2005/0217228 A1 | 10/2005 | Beall et al. | |
| 2005/0230029 A1 | 10/2005 | Vaidyanathan et al. | |
| 2005/0271920 A1 | 12/2005 | Eshraghi et al. | |
| 2006/0075731 A1 | 4/2006 | Ohno et al. | |
| 2006/0154057 A1 | 7/2006 | Nonninger | |
| 2007/0032370 A1 | 2/2007 | Weisensel et al. | |
| 2007/0044443 A1 | 3/2007 | Nixdorf et al. | |
| 2007/0068128 A1 | 3/2007 | Oshimi et al. | |
| 2007/0092692 A1 | 4/2007 | Masukawa et al. | |
| 2007/0111878 A1 | 5/2007 | Zuberi et al. | |
| 2007/0152364 A1* | 7/2007 | Zuberi et al. | 264/45.1 |
| 2007/0261557 A1 | 11/2007 | Gadkaree et al. | |
| 2008/0155951 A1 | 7/2008 | Riesmeier et al. | |
| 2008/0254254 A1 | 10/2008 | Ohno et al. | |

FOREIGN PATENT DOCUMENTS

| | | |
|---|---|---|
| EP | 01338326 | 8/2003 |
| EP | 01440722 | 7/2004 |
| EP | 01541216 | 6/2005 |
| GB | 2176179 | 12/1986 |
| JP | 61230747 | 10/1986 |
| JP | 63242980 | 10/1988 |
| JP | 03258347 | 11/1991 |
| JP | 06031177 | 2/1994 |
| JP | 07000757 | 1/1995 |
| JP | 2001-252529 | 9/2001 |
| KR | 2001016633 | 3/2001 |
| WO | WO-2006070540 | 7/2006 |

OTHER PUBLICATIONS

"Diesel Filter Materials", *DieselNet Technology Guide*, www.DieselNet.com,(Jan. 2003).

"Wall-Flow Monoliths", *DieselNet Technology Guide*, www.DieselNet.com,(Sep. 2005).

"Ceramic Catalyst Substrates", *DieselNet Technology Guide*, www.DieselNet.com,(Apr. 1997).

"Ceramic Fibers and Cartridges", *DieselNet Technology Guide*, www.DieselNet.com,(Jul. 2001).

Cooke, Theodore F., "Inorganic Fibers—A Literature Review", *J. Am. Ceram. Soc.*, 74 (12), (1991),2959-2978.

Miller, Robert K., et al., "Design, Development and Performance of a Composite Diesel Particulate Filter", *SAE Technical Paper Series*, 2002-01-0323,(Mar. 2002).

Li, Cheng G., et al., "Properties and Performance of Diesel Particulate Filters of an Advanced Ceramic Material", *SAE Technical Paper Series*, 2004-01-0955,(Mar. 2004).

Blackburn, Stuart et al., "Mullite-Alumina Composites by Extrusion", *J. Am. Ceram. Soc.* 75[41], (1992),953-957.

* cited by examiner

FIBER-BASED CERAMIC SUBSTRATE AND METHOD OF FABRICATING THE SAME

BACKGROUND OF THE INVENTION

The present invention relates generally to fiber-based ceramic substrates useful for insulation, filtration and/or high temperature chemical reaction processing, such as a catalytic host. The invention more particularly relates to an aluminosilicate fiber-based ceramic substrate and methods for producing the same.

Fiber-based ceramic substrates are commonly used for high temperature processes, such as exhaust filtration, insulation, and as a catalytic host in chemical reactors. Fiber-based ceramic substrates provide high operating temperature capabilities, with high strength and chemical inertness. Rigid structures can be formed that maintain structural integrity at extremely high temperatures in order to meet the processing requirements of the intended application. The ceramic fiber forming the basis for the substrate material composition can be fabricated from a number of materials in a variety of processes. For example, ceramic materials can be drawn into a fiber from a sol-gel, or melt-spun into fibers.

Fiber-based ceramic substrates exhibiting high strength with chemical and thermal stability are typically fabricated with high performance, high temperature, and thus, expensive ceramic fibers. For example, polycrystalline mullite fiber is highly stable, with mechanical integrity at temperatures in excess of 1700° C. These high performance materials require significantly more cost to manufacture due to the processes used to form the material into a fiber, and due to the purity and grade of the raw materials used to formulate the fibers. Fiber-based substrates from low cost materials such as vitreous aluminosilicate have not been associated with high performance, since the material de-vitrifies and crystallizes into a lower strength, and potentially hazardous, form when exposed to elevated operating temperatures.

Accordingly, there is a need for a fiber-based ceramic substrate that can be fabricated using low cost fibers that provide superior chemical and thermal resistance.

BRIEF SUMMARY OF THE INVENTION

The present invention provides a ceramic substrate using low-cost aluminosilicate fibers as the primary raw material, to attain a chemically and thermally stable rigid porous substrate.

In general, the invention features a method of forming a fiber-based ceramic substrate using low-cost aluminosilicate fiber having an alumina content in the range of about 15% to about 72% by weight with additives comprising an inorganic binder and an organic binder and a fluid that are mixed into a plastic mixture. The plastic mixture is formed into a green substrate, and heated to remove the organic binder, and to sinter the aluminosilicate fiber and inorganic binder to form an in-situ structure of mullite bonded with a stable amorphous glass. In this way, a material with performance characteristics similar to, or exceeding that of high performance materials, at substantially lower cost of materials and processing.

The method may feature one or more of the following aspects. In some implementations, the inorganic binder comprises cerium oxide. Similarly, the inorganic binder may comprise various types of clay binders, such as veegum or bentonite. The clay inorganic binders have various compositions of calcium oxide and/or magnesium oxide. In some implementations, the inorganic binder can be a glass frit. In some implementations, the inorganic binder is a fiber.

In some implementations, the inorganic binder can be selected to reduce the coefficient of thermal expansion of the resulting structure. For example, the use of titanium oxide as an inorganic binder results in the formation of an amorphous glass bonded polycrystalline structure having a lower CTE than the original aluminosilicate fibers.

In some implementations, the green substrate is formed by a casting process, such as, for example, a vacuum cast board. In other implementations, a honeycomb substrate is formed by extrusion. In some implementations, a pore former may be included with the additives to promote the porosity of the final substrate.

These and other features of the present invention will become apparent from a reading of the following descriptions, and may be realized by means of the instrumentalities and combinations particularly pointed out in the appended claims.

BRIEF DESCRIPTION OF THE SEVERAL VIEWS OF THE DRAWING

The drawings constitute a part of this specification and include exemplary embodiments of the invention, which may be embodied in various forms.

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Ceramic fiber-based substrate materials are useful for high temperature insulation, filtration, and for hosting catalytic reactions. The materials, in any of a variety of forms, can be used in high temperature applications as catalytic converters, NOx adsorbers, DeNox filters, multi-function filters, molten metal transport mechanisms and filters, regenerator cores, chemical processes, fixed-bed reactors, hydrodesulfurization, hydrocracking or hydrotreating, and engine exhaust filtration.

The high porosity, and high effective surface area provided by the fibrous microstructure provide excellent strength at low mass, and can survive wide and sudden temperature excursions without exhibiting thermal shock or mechanical degradation. Ceramic fibers can also be used to fabricate high temperature rigid insulating panels, such as vacuum cast boards, used for lining combustion chambers and high temperature environments that require impact resistance. Casting processes can also be used to from rigid structures of ceramic fibers such as kiln furniture and setter tiles.

High temperature processing of prior art aluminosilicate-based ceramic materials has been shown to promote the formation of cristobalite, which can present a health hazard to humans exposed to the substrate during operation, or particularly when the substrate is handled for removal, cleaning, or rebuilding. Cristobalite is a crystal phase of silica that has been designated as a known carcinogen with prolonged exposure in a dust form, thereby creating a new hazard in the attempt to reduce another. The present invention has been found to form ceramic fiber-based substrates of aluminosilicate fibers without the formation of cristobalite and to inhibit the formation of cristobalite during high temperature operating environments.

Figure 1:
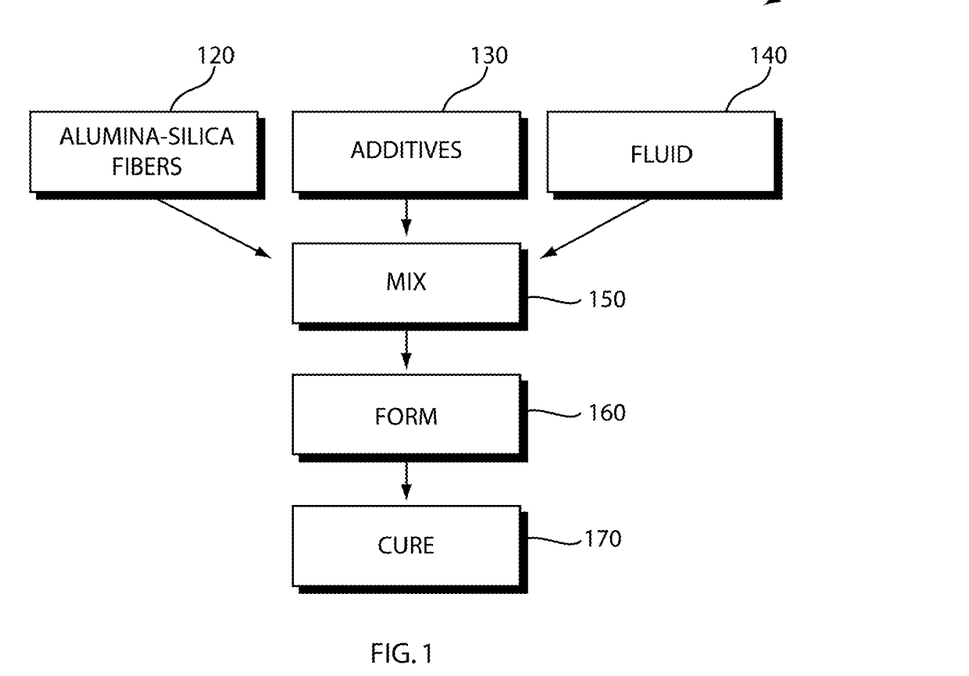
FIG. 1 is a flowchart of a method of forming a fiber-based ceramic substrate according to the present invention.

Referring to FIG. 1 a method 100 of fabricating an aluminosilicate fiber-based substrate according to the present invention is shown. Generally, aluminosilicate fibers 120, with additives 130 and a fluid 140, are mixed 150 into a plastic batch that is formed into a green substrate 160 and cured 170. The aluminosilicate fibers 120 and the additives 130 form a fibrous structure of mullite bonded with a chemically stable compound, that does not promote the formation of cristobalite during subsequent thermal processing.

Figure 2:
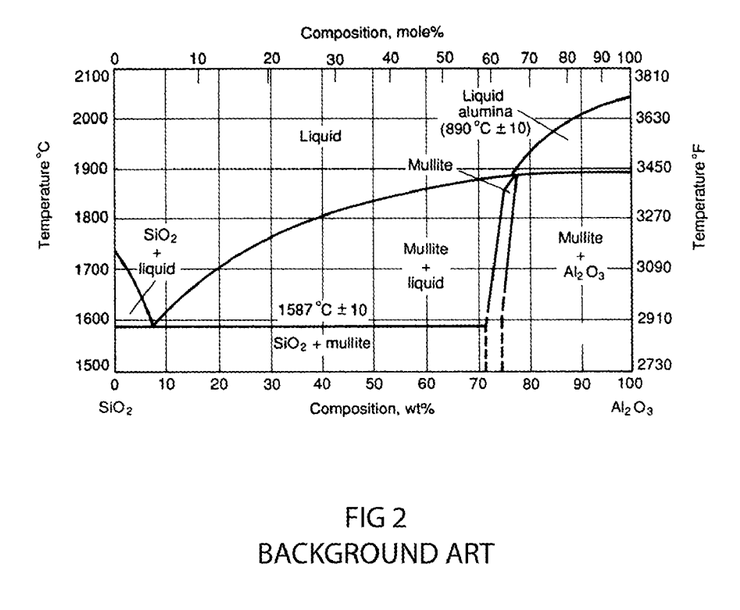
FIG. 2 is a binary phase diagram of compounds of alumina and silica according to the background art.

Aluminosilicate fiber 120 is commonly used as a refractory material, as it is available at low cost due to the abundance of raw materials used, and the ability to fiberize the material using a melt fiberization process, such as melt-spun or blown. The aluminosilicate fibers 120 are in an amorphous or vitreous state when initially provided in fiber form. Referring to FIG. 2, a phase diagram of alumina ($Al_2O_3$) and silica ($SiO_2$) is shown according to the background art. When aluminosilicate material having an alumina content between about 15% and about 72% (by volume or mass) is exposed to temperatures up to about 1600° C., the amorphous composition will form polycrystalline mullite and amorphous or crystalline silica. The process of de-vitrification and crystallization begins at temperatures as low as 900 C but the rate of reaction/conversion increases with temperature.

Mullite is the mineralogical name given to the only chemically stable intermediate phase in the $SiO_2$—$Al_2O_3$ system. Mullite is commonly denoted as $3Al_2O_3.2SiO_2$ (i.e., 60 mol % $Al_2O_3$ and 40 mol % $SiO_2$). However, this is misleading since mullite is actually a solid solution with the equilibrium composition limits of between about 60 and 63 mol % alumina below 1600° C. Mullite is a desirable phase of aluminosilicate materials due to its exceptional high temperature properties. The material exhibits high resistance to thermal shock and thermal stress distribution arising from its low coefficient of thermal expansions, good strength and interlocking grain structure. Mullite is also characterized by relatively low thermal conductivity and high wear resistance. These properties do not suffer much at elevated temperatures, allowing the substrate structure to remain useable at high temperatures.

Unlike mullite, which is chemically stable at elevated temperatures, silica exhibits a propensity to crystallize into its cristobolite crystal phase when exposed to temperatures exceeding 1000° C. over extended periods of time. The formation of cristobalite in an aluminosilicate-based substrate effectively reduces the structural integrity, as the material exhibits brittle fractures at relatively low strength. As discussed above, the potential for health risks exist, particularly when humans are exposed to the small particles in the form of a respirable dust that may be emitted from the substrate, either in use, or when handling the substrate after it has been exposed to high temperatures over time. For example, if the substrate is used for insulation of a combustion chamber or kiln, periodic maintenance or rebuilding of the kiln can present a health hazard to the maintenance personnel. If the substrate is used for high temperature exhaust filtration, such as a diesel particulate filter, cristobalite particles could be emitted if the substrate is damaged or cracked during use. According to the present invention, the additives 130 comprise inorganic binder materials that react with the silica remaining in the fiber (free silica) as mullite forms during the cure step 170 to inhibit the formation of cristobalite when the substrate is subsequently exposed to high temperatures over time.

Figure 3:
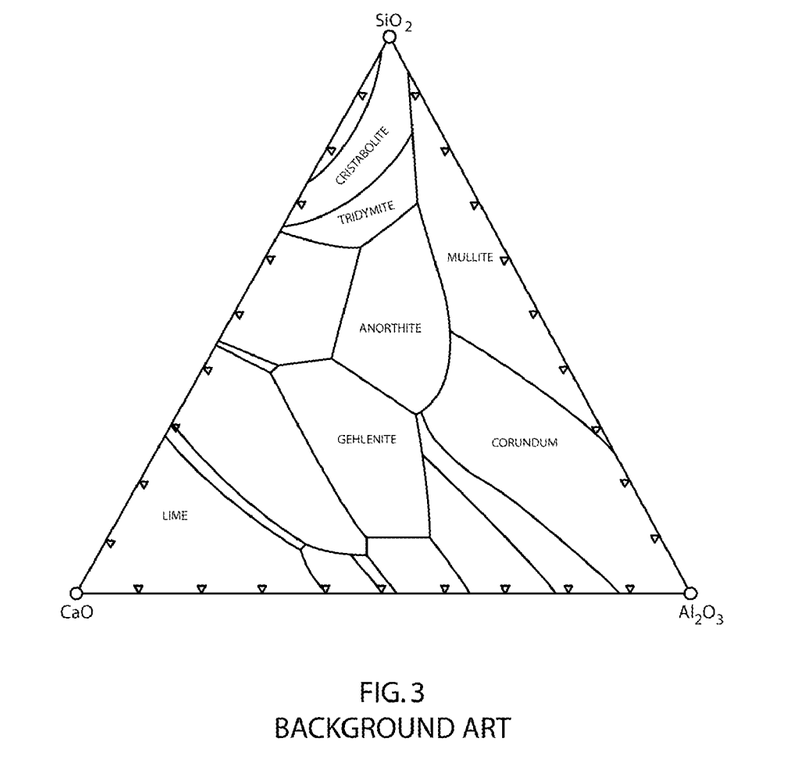
FIG. 3 is a ternary phase diagram of compounds of alumina, silica, and calcium oxide according to the background art.

The inorganic binder of the additives 130 can react with the aluminosilicate fibers 120 to inhibit the formation of cristobalite in operation in a number of ways. One such way is to change the phase formation of the silica from the fibers during the cure step 170. By reacting the free silica with the additives 130, a stable glass compound can be formed. Further, the composition of the additives 130 can react to form a ternary or other complex system with alumina and silica from the fibers 120, as shown in the plane projection of an exemplary ternary phase diagram in FIG. 3. The additives 130 comprising Calcium Oxide (CaO), commonly known as lime, react with the alumina and silica during the cure step 170 to form mullite with a stable glass bond. Another such way to inhibit the formation of cristobalite in operation is to react the additives 130 with the silica in the fibers to form an amorphous glass compound devoid of an ordered crystalline structure, so that without a seed for crystallization, the formation of cristobalite is inhibited.

In exemplary embodiments of the present invention, that will be described in more detail below, veegum clay comprising magnesium alumina silicate, bentonite clay comprising calcium magnesium alumina silicate, cerium, titanium oxide, and a glass frit, among others, can be included as an inorganic binder in the additive 130. For example, Ferro Frit 3851 used in glaze coatings of pottery contains alumina (26.8% by weight), silica (48.9%), magnesia (23.8%), and calcium oxide (0.5%), that can be used as an inorganic binder, though other materials having different compositions can also be used. Typically, the inorganic binder will be provided in powder or particle form, though alternatively, the inorganic binder can also be at least partially provided in a fiber form.

Referring back to FIG. 1, the aluminosilicate fibers 120 used in the method 100 are vitreous aluminosilicate fibers that are typically used as refractory materials, such as bulk or chopped fibers. In an exemplary embodiment, FIBERFRAX HS-95C from Unifrax, Niagara Falls, N.Y. can be used, or CERAFIBER from Thermal Ceramics, Augusta, Ga., or any similar melt-spun or melt-blown aluminosilicate fiber. Typically, the alumina/silica content will be in the range of 40-60 weight percent alumina with a balance of silica, though the method of the present invention can be implemented with any alumina/silica content in the range of about 15-72 weight percent alumina with a balance of silica. The diameter of the aluminosilicate fibers 120 should be dictated by the intended application of the substrate. For example, if a porous structure for high temperature filtration is desired, the fiber diameter must be considered in view of the resulting pore size, to attain a filtration media that is optimized for the particle characteristics to be filtered. In a specific example of a diesel particulate filter, a pore size of approximately 15 microns with 3-10 micron fibers has been shown to attain excellent trapping efficiencies with low backpressure for soot particles. Higher density materials using various fiber diameters can be attained for vacuum cast or cast substrates, where porosity is not essential, with excellent strength and dimensional uniformity.

The additives 130, as previously discussed, comprise inorganic binder materials that react with the aluminosilicate fiber to form a stable glass bonding a mullite structure during the subsequent curing operation 170. Additionally, the additives can contain organic binders, extrusion or forming aids, rheology modifiers and processing aids and plasticizers that may be useful during the subsequent forming step 160. For example, organic binders that can be included as additives 130 include methylcellulose, hydroxypropyl methylcellulose (HPMC), ethylcellulose and combinations thereof.

Pore formers can be included as additives 130 to enhance the porosity of the final structure. Pore formers are non-reactive materials that occupy volume in the plastic mixture during the mixing step 150 and the subsequent forming step 160, though readily removed during the cure step 170 via pyrolysis or by thermal degradation or volatilization. For example, micro-wax emulsions, phenolic resin particles, flour, starch, or carbon particles can be included as an additive 130 that will burn out during the subsequent curing step 160. The pore former can also impart fiber alignment or orientation characteristics during the forming step 160, depending upon the distribution of particle shape or aspect ratio. Inorganic binders can also act as a pore former when they are provided in a low density form, such as hollow spheres or aerogels.

Other processing aids, such as plasticizers, or rheology modifiers can be added as additives 130 to improve or optimize the formability of the plastic mixture during the subsequent forming step 160. The pore former materials or materials that react with the aluminosilicate fiber can also act as processing aids, by enhancing the plasticity or lubricity of the plastic mixture. For example, carbon pore formers provide lubrication when the plastic mixture is extruded into various forms, and the clay-based inorganic additives, such as vee-gum or bentonite, provide plasticity of the mixture.

The fluid 140 is added as needed to attain a desired rheology of the plastic mixture suitable for the forming step 160. Water is typically used, though solvents of various types can be utilized, along with liquids associated with additives, such as bonding agents or other additives that may be introduced into the mixture as a colloidal or sol suspension in a liquid. Rheological measurements can be made during the mixing step 150 to evaluate the rheology of the mixture compared with a desired rheology for the forming step 160. Excess fluid may not be desirable in that excessive shrinking may occur during the curing step 170 that may induce the formation of cracks in the substrate.

The aluminosilicate fibers 120, additives 130, and fluid 140 are mixed at the mixing step 150 to evenly distribute the materials into a homogeneous mass with a desired rheology for the forming step 160. This mixing may include dry mixing, wet mixing, shear mixing, and kneading, which may be necessary to evenly distribute the material into a homogeneous mass while imparting requisite shear forces to break up and distribute or de-agglomerate the fibers, particles and fluid. The amount of mixing, shearing, and kneading, and duration of such mixing processes depends on the fiber characteristics (length, diameter, etc.), the type and quantity of additives 130, and the type and amount of fluid 140, in order to obtain a uniform and consistent distribution of the materials within the mixture, with the desired rheological properties that are desired for the forming process 160.

The forming process can include any type of processing that forms the plastic mixture of the mixing step 150 into the desired form of the green substrate. As non-limiting examples, the forming step 160 can include extrusion, vacuum casting, and casting. The forming step 160 for the fiber-based ceramic substrate of the present invention is similar to the forming steps for powder-based ceramic substrate materials. In extrusion of a honeycomb substrate, the plastic mixture containing a suitable plasticizing aid such as HPMC, and having a suitable rheology, is forced under pressure through a honeycomb die to form a generally continuous honeycomb block that is cut to a desired length. The honeycomb die determines the size and geometry of the honeycomb channels, and can be rectangular, triangular, hexagonal, or other polygonal shaped channels, depending on the design of the extrusion die. Additionally, alternative designs, such as asymmetric channels, with wider inlet channels can also be implemented using appropriate extrusion dies. The extrusion system used for the forming step 160 can be of the type typically used to extrude powder-based ceramic materials, for example, a piston extruder or screw-type extruder. One skilled in the art will appreciate that certain aspects of the mixing step 150 can be performed in a screw extruder during the forming step 160. Vacuum cast processes and other casting methods can similarly form the plastic mixture into the green substrate with the rheology and plasticity of the plastic mixture having the properties sufficient to form the substrate and yet retain its shape for subsequent processing. Generally, the forming step 160 produces a green substrate, which has sufficient green strength to hold its shape and relative fiber arrangement during the subsequent curing step 170.

Forming the plastic mixture of aluminosilicate fibers 120, additives 130 and fluid 140 into a green substrate, and subsequently curing the substrate, as herein described below, creates a unique microstructure of intertangled fibers in a ceramic substrate. After the subsequent curing step 170, when certain portions of the additives 130 and fluid 140 are removed while still retaining the relative fiber spacing throughout the substrate, the resulting structure can become quite porous. The porosity of the substrate, as a result of the movement and alignment of the fibers during forming, exhibits an even distribution of pores within the substrate creating an open network of pores resulting from the spacing between fibers. Additionally, while the surface of the substrate can be viewed as more akin to a two-dimensional mat of interlocked and interconnected fibers, distinguished by the internal regions of the substrate, which is a three-dimensional structure of interlocked and interconnected fibers, the surface of the channel walls is not entirely planar. Fiber ends have a tendency to protrude out at an angle from the surface. These protrusions are particularly useful when the substrate is used as a filter, such as a diesel particulate filter, since the protrusion can act as nucleation, coagulation or trapping sites for soot, leading to efficient and uniform soot "cake" formation. The distribution of these sites over the surface of the channel walls ensures that a uniform accumulation of particulates can accumulate, which acts to improve trapping efficiency, more uniform deposition and regeneration of the soot on the filter.

The alignment of fibers, pore size, pore distribution, nucleation, coagulation, and trapping site distribution, and pore characteristics between wall surface and internal regions can be controlled by altering parameters of the forming step 160. For example, the rheology of the mixture, diameter and aspect ratio distributions of the fibers, characteristics of the additives, forming pressure and speed can be varied to attain desired characteristics in the resulting structure of the substrate.

Figure 4:
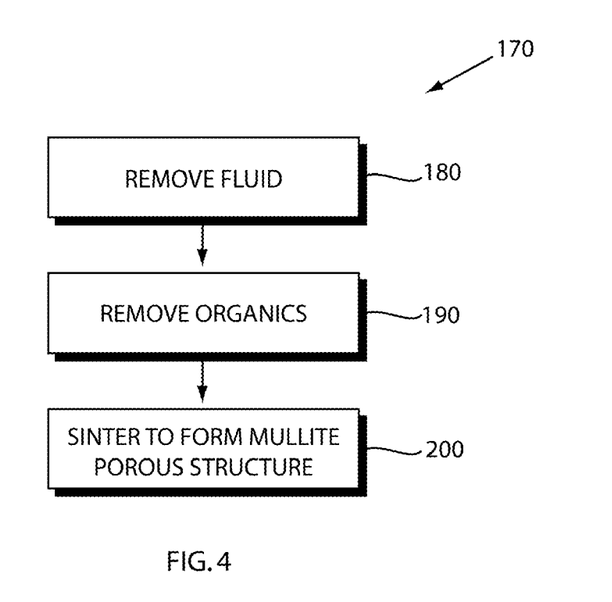
FIG. 4 is a flowchart of the curing step in the method of the present invention.

The curing step 170 is further described in reference to FIG. 4. The curing step 170 can be performed as the sequence of three phases: a fluid removal step 180, an organic removal step 190; and a sintering step 200. In the first phase, fluid removal 180, the green substrate is dried by removing the fluid using relatively low temperature heat with or without forced convection to gradually remove the fluid. Various methods of applying relatively low temperature heat into the green substrate to remove the fluid, such as, heated air convection heating, vacuum freeze drying, solvent extraction, microwave or electromagnetic/radio frequency (RF) drying methods, or a combination thereof. The fluid within the extruded green substrate must not be removed too rapidly from the substrate so that drying cracks due to shrinkage do not form. Typically, for aqueous based systems, the green substrates can be dried when exposed to temperatures between 90° C. and 150° C. for a period of about one hour, though the actual drying time may vary due to the size and shape of the substrates, with larger parts often taking longer to fully dry. In the case of microwave or RF energy drying, the fluids themselves, or other constituents in the extruded material adsorb the radiation to more evenly generate heat throughout the material. During the fluid removal step 180, depending on the selection of materials used as additives 130, the materials acting as a binder can congeal or gel to provide sufficient green strength of the substrate for handling purposes.

Once the green substrate is dried, or substantially free of the fluid 130 by the fluid removal step 180, the next phase of the curing step 160 proceeds to the organic removal step 190. This phase of the curing step 160 removes any organic components of the additives 120 through pyrolysis or by thermal degradation or volatilization, leaving substantially only the aluminosilicate fibers 120 and the inorganic constituents of the additives 130. The organic removal step 190 can be further parsed into a sequence of component removal steps, such as organic binder burnout followed by pore former burnout, when the organic constituents of the additives 120 are selected such that the curing step 160 can sequentially removes the components. For example, when HPMC, when used as a binder, will thermally decompose at approximately 300° C. When a carbon particle pore former is used, the carbon will oxidize into carbon dioxide when heated to approximately 600-900° C. in the presence of oxygen. Similarly, flour or starch, when used as a pore former, will thermally decompose at temperatures between 300° C. and 600° C. Accordingly, the green substrate using HPMC as a binder component of the additives 130 and a carbon particle pore former component of the additives 130 can be processed for organic removal 190 by subjecting the substrate to a two-step firing schedule to remove the binder and then the pore former. In this example, binder burnout can be performed at a temperature of at least 300° C., but less than 600° C. for a period of time, followed by pore former burnout at a temperature of at least 600° C., but less than a devitrification temperature of any of the inorganic constituents, such as the aluminosilicate fibers 120 or the inorganic binder of the additives 130. The thermally-sequenced curing step provides for a controlled removal of the additives 130 necessary to facilitate the forming process 160, and those that enhance the final microstructure of the substrate.

Alternatively, the curing step 170 can be sequentially controlled into any number of steps by controlling the environment thermally and/or chemically. For example, the organic removal step 190 can be performed in a first phase to selectively remove a first organic constituent, such as an organic binder, at a certain temperature in an inert environment, by purging the environment with an inert gas such as argon, nitrogen, helium, or by heating in a vacuum environment, or a partial vacuum purged with a low partial pressure of an inert gas. A subsequent phase can burn out a second organic constituent, such as a pore former, by initiating and maintaining the introduction of oxygen into the curing environment. Further, the organic removal step 190, may need to be controlled, either thermally or chemically, so that any exothermic reactions do not elevate the temperature within the substrate excessively. This level of control can be implemented through process control of the heating environment, or by metering the flow of oxygen into the heating environment.

During the organic removal step 190 of the curing step 170, as the organic components of the additives 120 are removed, the relative position of the aluminosilicate fibers 120 remains substantially the same as when the green substrate is formed during the forming step 160. The aluminosilicate fibers are in an intertangled relationship, with the inorganic binder of the additives 120 providing support. As the organic components of the additives 120 are removed, the inorganic components remain, such as the inorganic binder, to provide support for the fibers. Upon completion of the organic removal step 190, the mechanical strength of the substrate may be quite fragile, and the substrate may require careful handling procedures. It may be advantageous to perform the organic removal step 190 and the subsequent sintering step 200 in the same oven or kiln to minimize damage to the substrate due to handling.

The final phase of the curing step 160 is the sintering step 200. In this phase, the green substrate, substantially free of the fluid 130 and substantially free of organic components of the additives 120, is heated to a temperature in excess of 1000° C., but less than the 1587° C. liquidous (melting) temperature of the aluminosilicate fibers (as shown in the phase diagram of FIG. 1), typically between 1200° C. and 1500° C., to form stable mullite crystalline phase and a stable amorphous glass. In this sintering step 200, as the green substrate is heated and held at the sintering temperature, the vitreous aluminosilicate fibers 120 transition into polycrystalline mullite form as the alumina and silica combine into the mullite solid solution with the equilibrium composition limits of between about 60 and 63 mol % alumina, with the remaining silica reacting with the inorganic binder additives 130 to form an amorphous glass.

The actual composition and thermal and chemical properties of the resulting structure depends upon the selection of the fiber, the inorganic binder and the sintering time and temperature. For example, a veegum inorganic binder (calcium oxide-magnesia-alumina-silica clay) in the appropriate quantities will provide a glass having a coefficient of thermal expansion that closely matches the coefficient of thermal expansion of mullite, so that internal stresses may be minimized if the substrate is subjected to thermal shock. A bentonite inorganic binder, with increased quantities of calcium oxide, will likely yield a glass composition that has enhanced chemical resistance. The addition of silica, such as in the form of colloidal silica, can promote the formation of the amorphous glass, while also reacting with other constituents of the inorganic binder to form the stable amorphous glass. Further, a ceria-based inorganic binder can yield a glass composition that is highly compatible with catalysts and washcoats, such as may be used in diesel particulate filters and/or engine exhaust emission controls. Similarly, chemicals that form ceria, such as cerium nitrate, or others, can be used as an inorganic binder to enhance the composition of the stable amorphous glass to be compatible with catalyst coatings. Further, aluminum phosphate can be used as an inorganic binder. Acid alumina phosphate refers to a liquid solution of phosphoric acid ($H_3PO_4$) and an aluminum salt (e.g., aluminum hydroxide), such that the proportion of acid is above that needed to form solid aluminum phosphate (e.g., $Al(PO_3)_3$ or $AlPO_4$). Phosphoric acid itself can be used as an inorganic binder, but the addition of aluminum enhances the reactivity with the aluminosilicate fibers in the formation of a stable amorphous glass or stable compound. A titanium oxide inorganic binder will yield a glass composition that effectively lowers the coefficient of thermal expansion of the final structure, which may be particularly useful in applications where high thermal gradients may exist in operation.

Figure 5:
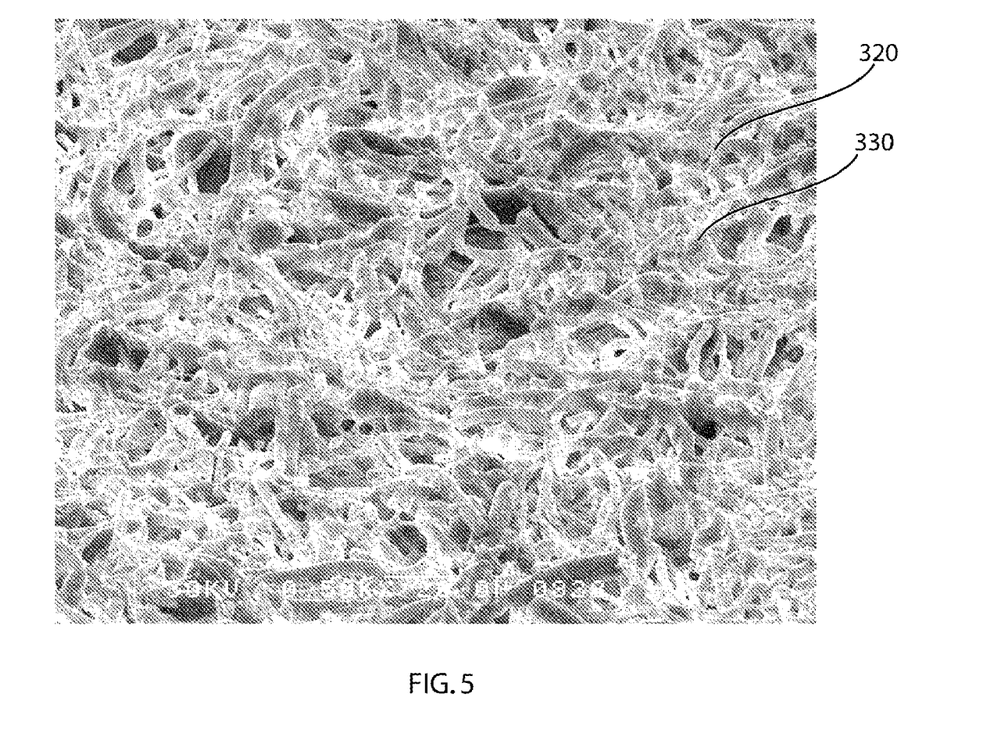
FIG. 5 is a scanning electron microscopic image representation of the fiber-based ceramic substrate according to the present invention.
Figure 6:
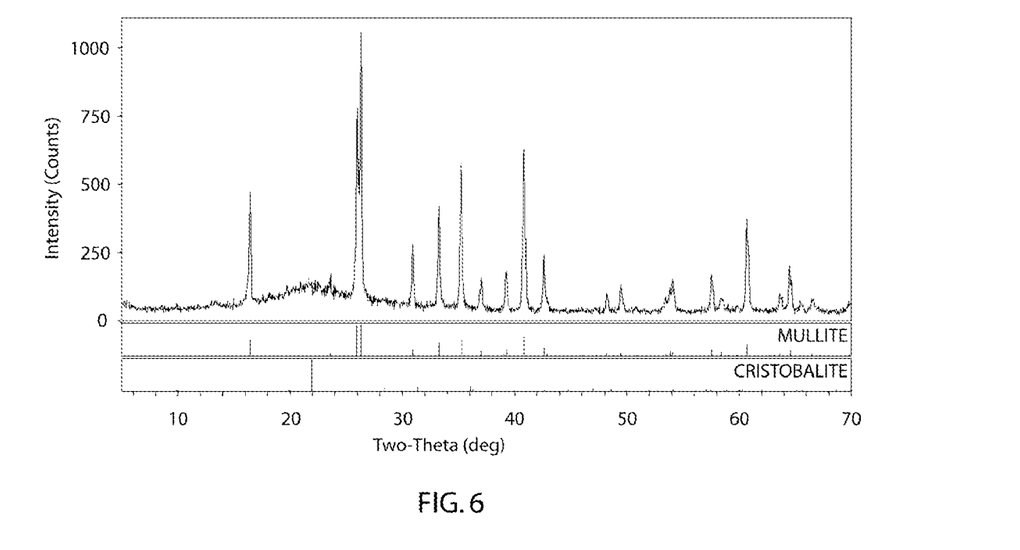
FIG. 6 is an x-ray diffraction analysis of an exemplary embodiment of the present invention that depicts the composition of crystalline phases within the substrate.

FIG. 5 depicts a scanning electron image representation of the present invention. The aluminosilicate fiber 120 and the additives 120 form a polycrystalline mullite structure 320 that retains the approximate fiber form of the original aluminosilica fibers, within an amorphous glass surrounding and bonding the fibers. FIG. 6 depicts an x-ray diffraction (XRD) analysis of the exemplary embodiment, that clearly shows the only crystalline structures to be associated with mullite, with the absence of any indication of cristobalite.

For example, a fiber-based ceramic substrate may be formed using any of the following compositions of additives 130 with low-cost aluminosilicate fibers to form a substrate that does not exhibit the formation of cristobalite during formation or when subsequently operated at elevated temperatures.

In a first illustrative embodiment using veegum as the inorganic binder, a plastic mixture was prepared with 25.3% by weight aluminosilicate fiber (approximately 50/50 alumina/silica) with 2.0% by weight veegum as the inorganic binder, 8.1% by weight hydroxypropyl methylcellulose (HPMC) as an organic binder, 32.9% by weight carbon particles (0.325 mesh grade), and 31.7% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

In a second illustrative embodiment using bentonite as the inorganic binder, a plastic mixture was prepared with 24.2% by weight aluminosilicate fiber (approximately 50/50 alumina/silica) with 2.2% by weight bentonite and 4.8% colloidal silica (50% concentration), collectively, the inorganic binder, 7.7% by weight hydroxypropyl methylcellulose (HPMC) as an organic binder, 31.4% by weight carbon particles (0.325 mesh grade), and 29.7% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

In a third illustrative embodiment using a frit as the inorganic binder, a plastic mixture was prepared with 23.0% by weight aluminosilicate fiber (approximately 50/50 alumina/silica), 2.8% by weight frit 3851 as the inorganic binder, 7.4% by weight hydroxypropyl methylcellulose (HPMC) as an organic binder, 30.0% by weight carbon particles (0.325 mesh grade) as a pore former to promote porosity, and 36.8% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

In a fourth illustrative embodiment using aluminum phosphate as the inorganic binder, a plastic mixture was prepared with 23.0% by weight aluminosilicate fiber (approximately 50/50 alumina/silica), 2.8% by weight aluminum phosphate ($Al(H_2PO_4)$) as the inorganic binder, 7.4% by weight hydroxypropyl methylcellulose (HPMC) as an organic binder, 30.0% by weight carbon particles (0.325 mesh grade) as a pore former to promote porosity, and 36.8% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

In a fifth illustrative embodiment using colloidal cerium as the inorganic binder, a plastic mixture was prepared with 23.2% by weight aluminosilicate fiber (approximately 50/50 alumina/silica), 9.3% by weight colloidal cerium as the inorganic binder, 7.4% by weight hydroxypropyl methylcellulose (HPMC) as an organic binder, 30.1% by weight carbon particles (0.325 mesh grade) as a pore former to promote porosity, and 30.0% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

In a sixth illustrative embodiment using titanium dioxide, or titania ($TiO_2$) as the inorganic binder, a plastic mixture was prepared with 22.5% by weight aluminosilicate fiber (approximately 50/50 alumina/silica), 5.0% by weight titanium dioxide particles as the inorganic binder, 7.2% by weight hydroxypropyl methylcellulose (HPMC) as an organic binder, 29.3% by weight carbon particles (0.325 mesh grade) as a pore former to promote porosity, and 36.0% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

In a seventh illustrative embodiment using a magnesia silicate fiber as the inorganic binder, a plastic mixture was prepared with 26.5% by weight aluminosilicate fiber (approximately 50/50 alumina/silica), 3.3% by weight ISOFRAX biosoluble magnesia silicate fiber and 5.2% by weight talc powder (magnesium silicate), collectively, the inorganic binder, 6.6% by weight hydroxypropyl methylcellulose (HPMC) as an organic binder, 26.9% by weight carbon particles (0.325 mesh grade) as a pore former to promote porosity, and 31.5% DI water as the fluid. The materials were mixed into a plastic mixture and formed into 1" diameter honeycomb substrates by extrusion. The substrates were dried using RF, and the organics removed, followed by a sintering operation at 1500° C. for one hour to form a structure of mullite bonded with a stable amorphous glass.

The present invention has been herein described in detail with respect to certain illustrative and specific embodiments thereof, and it should not be considered limited to such, as numerous modifications are possible without departing from the spirit and scope of the appended claims.

What is claimed is:
1. A method of fabricating a ceramic substrate comprising:
   providing aluminosilicate fibers having an alumina content in the range of about 15% to about 72% by weight;

mixing the fibers with additives comprising an inorganic binder comprising colloidal cerium and an organic binder, and a fluid to provide a plastic mixture;

forming the plastic mixture into a green substrate;

heating the green substrate to remove the fluid and the organic binder; and sintering the green substrate so that the aluminosilicate fibers and the inorganic binder form a structure of mullite fiber bonded with a stable amorphous glass.

2. A method of fabricating a ceramic substrate comprising:

providing aluminosilicate fibers having an alumina content in the range of about 15% to about 72% by weight;

mixing the fibers with additives comprising an inorganic binder comprising magnesium alumina silicate comprising veegum and an organic binder, and a fluid to provide a plastic mixture;

forming the plastic mixture into a green substrate;

heating the green substrate to remove the fluid and the organic binder; and sintering the green substrate so that the aluminosilicate fibers and the inorganic binder form a structure of mullite fiber bonded with a stable amorphous glass.

* * * * *